United States Patent Office 3,377,305
Patented Apr. 9, 1968

3,377,305
HEAT SEALABLE COATING COMPOSITION
Arthur A. House, Freehold, N.J., assignor to Cities Service Oil Company, Bartlesville, Okla., a corporation of Delaware
No Drawing. Filed July 18, 1966, Ser. No. 565,738
10 Claims. (Cl. 260—27)

ABSTRACT OF THE DISCLOSURE

A wax composition suitable for use as laminating or heat sealing agents in the packaging arts, comprising from about 30% to about 70% wax, from about 10% to about 40% of a rosin ester, from about 0.5% to about 20% of a polyamide resin, and from about 10% to about 40% of an ethylene-RCOOR' copolymer. The wax preferably has a melting point of about 110° F. to about 210° F. and a viscosity of from about 35 to about 120 SUS at 210° F., the polyamide resin may be produced by interacting ethylene diamine and dimerized linoleic acid and have a molecular weight of from about 5,000 to about 10,000 and the ethylene-RCOOR copolymer may be vinyl acetate.

---

This invention relates to an improved wax-containing composition having outsanding heat-sealing properties.

It is known to employ wax-containing compositions as laminating or heat-sealing agents in the packaging arts. For example, wax coatings have been employed in manufacturing sealed packages such as wax paper wrappings for food packages and the like, bread wrappers, paper milk containers and various other laminated paper compositions in which sealing strength is required. Wax compositions have also been used in the lamination of metallic foil, such as steel foil or aluminum foil, to paper or suitable plastic materials in the fabrication of containers. In all such applications, it is necessary that the wax composition develop a strong bond between the laminae when sealed by heat and pressure.

It is, therefore, an object of the present invention to provide a wax-containing composition which has outstanding heat-sealing and other characteristics.

It is another object of the invention to provide a heat-sealable wax composition which may be used with advantage in the lamination of paper to paper, paper to plastic, metallic foil to paper and metallic foil to plastic.

Various other objects and advantages of the invention will become apparent to those skilled in the art from the following detailed description thereof.

Briefly, the heat-sealable compositions of my present invention are homogeneous blends of petroleum wax, rosin ester, polyamide and a co-polymer of ethylene with a co-monomer having the formula

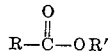

wherein R is hydrocarbyl radical and R' is a radical selected from the group consisting of hydrogen and hydrocarbyl radicals, one of R and R' being an ethylenically unsaturated hydrocarbyl radical.

More particularly, the petroleum waxes employed in the present compositions may advantageously have a melting point of from about 110° F. to about 210° F. and a viscosity of from about 35 to about 120 SUS at 210° F. The wax may be a paraffin wax or a microcrystalline wax or a mixture of paraffin and microcrystalline waxes. The preferred petroleum waxes are the paraffin waxes characterized by a melting point of from about 120° F. to about 155° F. and a viscosity of from about 35 to about 60 SUS at 210° F., and blends of such paraffin waxes with a microcrystalline wax having a melting point of about 130 to about 210° F. and a viscosity of from about 60 to about 120 SUS at 210° F., the paraffin wax component constituting at least about 50% of the total amount of wax.

Rosin esters are employed in the present composition to increase the mutual solubility of the various components in the blend and to control "bloom," or the migration of wax or other components to the surface of the coating. Suitable rosin esters are commercially available and include, for example, the pentaerythritol esters of wood rosin, polymerized wood rosin, hydrogenated wood rosin and hydrogenated rosin, respectively; glycerol esters of hydrogenated rosin; and phenolic-modified rosins. The rosin esters may be liquid, semi-solid or solid substances that melt below about 350° F.

The polyamide component of the composition desirably is characterized by a ring and ball softening point (ASTM D-36-62T) of less than 390° F., preferably from about 210° F. to about 375° F. Suitable polyamide resins are, for example, those disclosed by U.S. Patent 2,379,413 of Theodore F. Bradley, in accordance with which, ammonia, a primary or secondary amine, or an alkanol amine is reacted with an acid or ester obtained by addition polymerization at elevated temperature of a member of the group consisting of multi-unsaturated fatty acids and their esters. A particularly suitable group of polyamide resins produced in accordance with the Bradley process are those derived from the reaction of dimerized linoleic acid with di- or polyamines, e.g., ethylene diamine, and having a molecular weight of from about 5,000 to about 10,000. Such polyamides are particularly preferred for the purposes of the invention due to their somewhat branched molecular structure and, consequently, good solubility in the composition. However, relatively more crystalline, linear polyamide resins having a softening point within the above-cited ranges may also be used in the compositions of the invention alone or in conjunction with the relatively branched-chain polyamide resins.

Suitable copolymers of ethylene with an ethylenically-unsaturated monomer having the formula RCOOR' are those having a ring and ball softening point of from about 150° F. to about 350° F., preferably 240° to 315° F., and a melt index (ASTM-1238) of from about 0.1 to about 400, preferably from about 2 to about 260. Illustrative of comonomers represented by the formula RCOOR', wherein either R or R' is an ethylenically-unsaturated hydrocarbyl radical, are acrylic acid, methyl acrylate, ethyl acrylate, isobutyl acrylate, vinyl acetic acid, ethyl vinylacetate, vinyl acetate, vinyl propionate and vinyl butyrate, with vinyl acetate being particularly preferred. Preferably, the copolymers contain from about 60% to about 85% by weight, particularly 65% to 82%, by weight, of ethylene, and correspondingly from about 15% to about 40%, by weight, of the comonomer, preferably 18 to about 35%, by weight, comonomer.

The compositions of the present invention may advantageous comprise from about 30% to about 70% wax, from about 10% to about 40% rosin ester, from about 0.5% to about 20% polyamide and from about 10% to about 40% of the ethylene-RCOOR' copolymer. However, compositions containing from about 40 to about 60% wax, from about 15 to about 35% rosin ester, from about 1 to about 10% polyamide, and from about 15 to about 35% of the ethylene-RCOOR' copolymer appear to have optimum adhesion and heat-sealing characteristics, as well as other desirable properties such as flexibility, tensile strength, heat stability, abrasion resistance, gas and moisture barrier characteristics and grease resistance. If desired, the composition may also comprise minor amounts of one or more additional ingredients. For example, an antioxidant, such as butylated hydroxytoluene, may be incorporated in the composition in an amount of from about 0.001 to about 1% by weight to aid in preventing decomposition.

Various methods may be employed to prepare the homogeneous compositions of the invention. For instance, the wax component may be melted at a suitable temperature and the ethylene-RCOOR' copolymer incorporated therein with vigorous high shear stirring. When solution is essentially complete, a melted mixture of the polyamide and rosin ester may be added slowly while the temperature of the wax melt is gradually raised to the polyamide melt point. High shear stirring is continued until the entire composition becomes homogeneous. The resultant homogeneous composition is soft and sticky at above-normal temperatures, e.g., above about 250° F., and may be readily applied to laminae by conventional techniques, but upon cooling, forms a strong bond between the laminae.

In order to further describe the invention and illustrate the outstanding sealing strength properties of the compositions, the following specific and non-limitative examples are presented.

EXAMPLES 1-5

The following examples illustrate the superior sealing strength characteristics of the wax-containing compositions of the invention in laminating glassine paper or sulfite paper to polyethylene, aluminum foil, steel foil, saran and cellophane, respectively. More particularly, the examples illustrate the advantages obtained by the use of a small amount of polyamide resin in conjunction with the wax, rosin ester and ethylene-RCOOR' copolymer components of the blend.

In each of the examples, the wax component was a fully-refined paraffin wax characterized by a melting point of 150° F. AMP (American Melting Point), a viscosity of 43.6 SUS at 210° F., a needle penetration of 14 decimillimeters at 77° F., a color of 30 Saybolt and an oil content of 0.2 weight percent. The rosin ester was a pentaerythritol ester of polymerized wood rosin and was characterized by melting point of from about 267° F., to about 282° F. The ethylene-RCOOR' copolymer was a copolymer of about 72% ethylene and about 28% vinyl acetate having a ring and ball softening point of about 307° F. and a melt index of about 3.0.

The polyamides denoted "Polyamide A" and "Polyamide B" in the following table were relatively linear crystalline resins having softening points (ring and ball) of about 230° F. and about 215° F., respectively, while the polyamide denoted "Polyamide C" was a relatively more branched-chain resin characterized by a ring and ball softening point of about 230° F.

The compositions were prepared by heating the paraffin wax to a temperature of approximately 325° to 340° F. and then gradually adding the ethylene-vinyl acetate copolymer while subjecting the wax melt to vigorous high shear stirring. Upon obtaining a homogeneous admixture, a mixed melt of rosin ester-polyamide resin (at a temperature of about 400° F.) was gradually added to the wax-copolymer melt with vigorous stirring. The temperature of the blend was maintained at about 350° F. to about 400° F. and stirring was continued for 10 minutes until the total blend became homogeneous.

The melted compositions were applied to amber glassine (40 pounds/ream) and sulfite (25 pounds/ream bread wrap) papers by pouring the melts on to the paper and then metering the coatings to a uniform 0.5 mil thickness by means of a heated draw-down bar. The coated papers were then conditioned overnight at 73° and 50% relative humidity, cut to 2 x 3 inch swatches and then heat sealed to 2 x 3 inch swatches of polyethylene, saran, cellophane, aluminum foil and steel foil, respectively, using a commercial heat-sealer apparatus. The heat sealing was accomplished using a jaw dwell time of 3 seconds and a jaw pressure of 6 pounds per square inch. The heat-sealing temperature was 325° F., except in the heat-sealing of polyethylene to the coated papers, in which cases the heat sealing was accomplished at 250° F.

The resultant laminates were conditioned as prescribed by TAPPI method T 402 m–49 (24 hours at 73° F. and 50% relative humidity) and the seal strengths were then determined by measuring the amount of tension in grams per linear inch required to peel the laminae apart at a standard pull rate of 5 inches per minute. Higher values, of course, indicate higher seal strengths. Five runs were made, and the sealing strength was reported as an average thereof. The designation FT in the table set forth below indicates a fiber-tearing seal, i.e., the seal was so strong that upon attempting to peel the laminae strips apart, the paper substrate tore.

The compositions and sealing strengths thereof developed between various laminae were as follows:

TABLE 1

| Example | Components (Wt. percent) | | | | | Sealing Strengths in gms./in. (avg. of 5 runs) | | | | | | | | | |
| | Paraffin Wax | Ethylene-Vinyl Acetate Copolymer | Rosin Ester | Polyamide | | | Glassine to— | | | | | Sulfite to— | | | | |
| | | | | A | B | C | Polyethylene | Al. Foil | Steel Foil | Saran | Cellophane | Polyethylene | Al. Foil | Steel Foil | Saran | Cellophane |
| 1 (Control) | 55 | 25 | 20 | | | | 20 | 30 | 25 | 15 | 15 | 30 | 75 | 90 | 15 | 25 |
| 2 | 53 | 25 | 20 | 2 | | | 65 | 60 | 115 | 90 | 40 | FT | 180 | FT | FT | 130 |
| 3 | 50 | 25 | 20 | 5 | | | 85 | 75 | 105 | 80 | 90 | FT | 115 | 120 | FT | 100 |
| 4 | 50 | 25 | 20 | | 5 | | 150 | 140 | 20 | FT | 90 | FT | 165 | 80 | FT | 175 |
| 5 | 50 | 25 | 20 | | | 5 | 120 | 205 | 195 | FT | 165 | FT | FT | FT | FT | FT |

It will be noted from the above data that the sealing strengths developed by the compositions containing polyamide were greatly superior to those of the control composition (Example 1) which did not contain polyamide resin. Furthermore, the composition of Example 5, which contains the preferred polyamide resin contemplated by the invention, namely a somewhat branched-chain resin having a molecular weight of from about 5,000 to 10,000 and prepared by the reaction of a di- or polyamine with a dimerized multi-unsaturated fatty acid (e.g., dimerized linoleic acid), had generally superior sealing strength characteristics compared to the compositions containing the relatively more linear polyamide resins.

EXAMPLES 6-8

The following examples illustrate the use of a blend of paraffin wax and microcrystalline wax as the wax component of the present compositions.

In each of the examples, the paraffin wax, ethylene-vinyl acetate copolymers and rosin ester components were those previously described in connection with Examples 1-5. The microcrystalline wax was one characterized by a melting point of 180° F. (ASTM-D-27), a viscosity of 95 SUS at 210° F., a needle penetration of 17 decimillimeters at 77° F. and 68 at 110° F., an oil content of 1.25 weight percent and an ASTM color of 2. The polyamides designated "A" and "B" correspond to polyamides "A" and "B" in the previous examples.

The homogeneous compositions were prepared and coated on the paper substrates and the laminations were fabricated following the general procedure set forth in the previous examples. Sealing strengths were determined as previously described, except that only one run was made.

The compositions and sealing strengths were as set forth in Table 2, below:

TABLE 2

| Example | Components (Wt. Percent) | | | | | | Sealing Strengths (g./in.) | | | |
|---|---|---|---|---|---|---|---|---|---|---|
| | Paraffin Wax | Microcrystalline Wax | Rosin Ester | Ethylene-Vinyl Acetate Copolymer | Polyamide A | Polyamide B | Glassine to— | | Sulfite Paper to— | |
| | | | | | | | Polyethylene | Saran | Polyethylene | Cellophane |
| 6 (Control) | 33 | 20 | 24 | 23 | | | 35 | 110 | 30 | 60 |
| 7 | 30 | 20 | 24 | 23 | 3 | | FT | 300 | FT | 100 |
| 8 | 30 | 20 | 24 | 23 | | 3 | FT | FT | FT | 90 |

As will be apparent from the data, the paraffin wax-microcrystalline wax compositions containing the polyamides had superior heat sealing properties compared to the control composition (Example 6).

EXAMPLES 9–11

In addition to the petaerythritol ester of polymerized wood rosin, other rosin esters may also be employed. The following examples illustrate the use of a pentaerythritol ester of hydrogenated rosin having a melting point of about 219° F. to about 230° F.; a glycerol ester of hydrogenated rosin having a melting point of about 176° F. to about 190° F.; and a pentaerythritol ester of hydrogenated wood rosin having a melting point of about 215° F. to 230° F.

The sealing strengths of sulfite paper to cellophane using the compositions were as follows:

TABLE 3

| | Example | | |
|---|---|---|---|
| | 9 | 10 | 11 |
| Components (wt. percent): | | | |
| Paraffin wax | 53 | 53 | 53 |
| Ethylene-vinylacetate copolymer | 25 | 25 | 25 |
| Rosin ester: | | | |
| Pentaerythritol ester of hydrogenated rosin | 20 | | |
| Glycerol ester of hydrogenated rosin | | 20 | |
| Pentaerythritol ester of hydrogenated wood rosin | | | 20 |
| Polyamide: | | | |
| Rel. linear polyamide (Softening Pt. of 230° F.) | | 2 | 2 |
| Rel. branched-chain polyamide (Softening Pt. 230° F.) | 2 | | |
| Sealing Strength, Sulfite paper to Cellophane (g./in.) | FT | FT | 200 |

While the invention has been described above with respect to certain preferred embodiments thereof, it will be understood that various changes and modifications may be made without departing from the spirit and scope as expressed in the appended claims.

Therefore, I claim:

1. A homogeneous composition comprising from about 30% to about 70% of petroleum wax, from about 10% to about 40% of rosin ester, from about 0.5% to about 20% of polyamide resin and from about 10% to about 40% of a copolymer of ethylene and a monomer represented by the formula $$R-\overset{O}{\underset{\|}{C}}-OR'$$

wherein R is a hydrocarboyl radical and R' is a radical selected from the group consisting of hydrogen and hydrocarbyl radicals, one of R and R' being an ethylenically-unsaturated hydrocarboyl radical, said petroleum wax having a melting point of from about 110° F. to about 210° F. and a viscosity of from about 35 to about 120 SUS at 210° F., said rosin ester having a melting point below about 350° F., said polyamide resin having a ring and ball softening point below about 390° F., and said ethylene —RCOOR' copolymer containing from about 60% to about 85%, by weight, ethylene and correspondingly from about 15% to about 40%, by weight, RCOOR', and being further characterized by a ring and ball softening point of from about 150° F. to about 350° F. and a melt index of from about 0.1 to about 400.

2. Compositon as in claim 1 wherein said petroleum wax component comprises at least about 50% by weight of a paraffin wax characterized by a melting point of from about 120° F. to about 155° F. and a viscosity of from about 35 to about 60 SUS at 210° F.

3. Composition as in claim 1 wherein said polyamide resin has a ring and ball softening point of from about 210° F. to about 375° F.

4. Composition as in claim 1 wherein said ethylene-RCOOR' copolymer contains from about 65% to about 82%, by weight, ethylene and correspondingly from about 18% to about 35%, by weight, RCOOR', and has a ring and ball softening point of from about 240° F. to about 315° F. and a melt index of from about 2 to about 260.

5. Composition as in claim 1 wherein said polyamide resin is a relatively branched-chain resin having a molecular weight of from about 5,000 to about 10,000 and is produced by interacting a member of the group consisting of ammonia, primary and secondary amines and alkanol amines with a member of the group consisting of acids and esters obtained by addition polymerization of a member of the group consisting of multi-unsaturated fatty acids and their esters.

6. Composition as in claim 5 wherein said polyamide is produced by interacting ethylene diamine and dimerized linoleic acid.

7. Composition as in claim 1 wherein said comonomer represented by the formula RCOOR' is vinyl acetate.

8. Composition as in claim 1 wherein the petroleum wax is present in an amount of from about 40% to about 60%, the rosin ester is present in an amount of from about 15% to about 35%, the polyamide is present in an amount of from about 1% to about 10% and the ethylene-RCOOR' copolymer is present in an amount of from about 15% to about 35%.

9. Composition as in claim 2 wherein essentially all of said petroleum wax component is said paraffin wax.

10. Composition as in claim 2 wherein said petroleum wax component is a mixture of said paraffin wax and a microcrystalline wax having a melting point of about 130° F. to about 210° F. and a viscosity of from about 60 to about 120 SUS at 210° F., the amount of paraffin wax in said wax mixture being at least about 50%.

References Cited

UNITED STATES PATENTS 2,728,737 12/1955 Wittcoff _____ 260—27
3,232,895 2/1966 Klein et al. _____ 260—27

DONALD E. CZAJA, *Primary Examiner.*

W. PARKER, *Assistant Examiner.*